United States Patent [19]

Grauel et al.

[11] Patent Number: 4,697,260

[45] Date of Patent: Sep. 29, 1987

[54] METHOD OF AND ARRANGEMENT FOR TRANSMITTING MESSAGES IN A DIGITAL RADIO TRANSMISSION SYSTEM

[75] Inventors: Christoph Grauel, Feucht; Ludwig Kittel, Heroldsberg; Werner Schmidt, Lauf-Ödenberg; Ulrich Wellens, Heroldsberg, all of Fed. Rep. of Germany

[73] Assignee: U.S. Philips Corporation, New York, N.Y.

[21] Appl. No.: 810,439

[22] Filed: Dec. 17, 1985

[30] Foreign Application Priority Data

Dec. 22, 1984 [DE] Fed. Rep. of Germany ....... 3447107

[51] Int. Cl.$^4$ .......................... H04J 9/00; H04J 13/00; H04Q 7/00
[52] U.S. Cl. ........................................ 370/18; 455/33; 455/54; 379/59; 370/69.1
[58] Field of Search ................ 370/18, 110.1, 11, 120, 370/124, 69.1, 110.4; 455/33, 54; 379/59, 60

[56] References Cited

U.S. PATENT DOCUMENTS

| 4,455,662 | 6/1984 | Gutleber | 370/18 |
| 4,472,815 | 9/1984 | Gutleber | 370/18 |
| 4,475,214 | 10/1984 | Gutleber | 370/18 |
| 4,528,656 | 7/1985 | Morais | 370/69.1 |

Primary Examiner—Douglas W. Olms
Assistant Examiner—Frank M. Scutch, III
Attorney, Agent, or Firm—Thomas A. Briody; Jack Oisher; Leroy Eason

[57] ABSTRACT

A method and apparatus for use in a digital radio transmission system comprising stationary radio stations arranged in a cellular network and to which are assigned a plurality of mobile radio stations. Transmission of digital messages from a stationary radio station to the mobile radio stations assigned to it is effected by wideband code division multiplex modulation, and transmission of digital messages from such mobile radio stations to the stationary radio station is effected by narrowband frequency multiplex modulation. This reduces bandwidth requirements and improves the signal-to-noise ratio for each direction of transmission.

13 Claims, 2 Drawing Figures

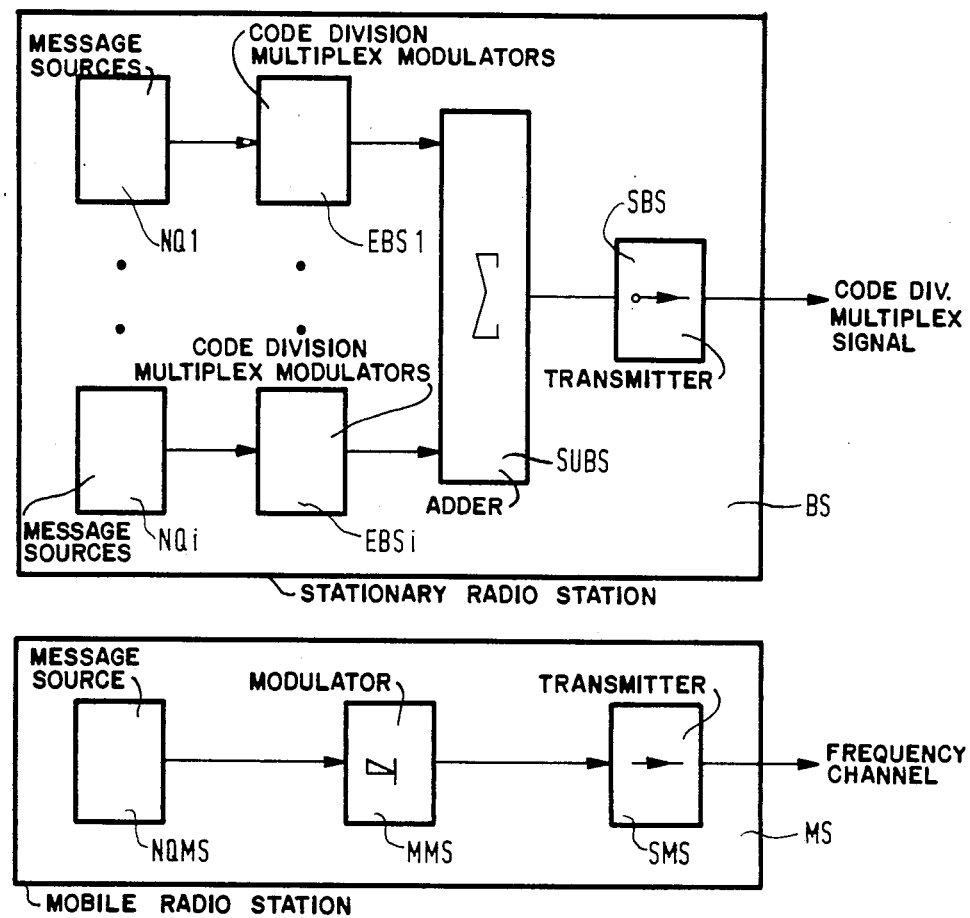
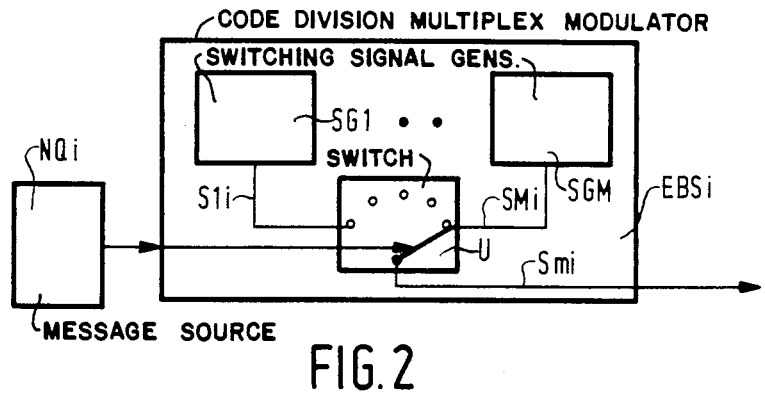
FIG. 1
FIG. 2

METHOD OF AND ARRANGEMENT FOR TRANSMITTING MESSAGES IN A DIGITAL RADIO TRANSMISSION SYSTEM

BACKGROUND OF THE INVENTION

1. Field of the Invention

The invention relates to a method of and arrangement for transmitting messages between a fixed radio station and a plurality of mobile radio stations in a digital radio transmission system, and particularly to such a system wherein transmission by the base station is by code division multiplex modulation and transmission by the mobile stations is by frequency division multiplex modulation.

2. Description of the Related Art

For the transmission of messages via a transmission means (for example lines, radio paths) used in common by a plurality of subscribers, three basic methods are known, namely the code-division multiplex method, the frequency-division multiplex method and the time-division multiplex method.

In the code-division multiplex method the different messages to be conveyed over a common transmission channel are, for example, modulated on a carrier by means of basic modulation and the resultant signal, which has a narrow band compared with the general bandwidth, is spectrally distributed over the channel bandwidth by multiplex modulation with the aid of a code word identifying the receiver. The code multiplex channel (message transmission channel) thus obtained is not limited in time or bandwidth, but is limited as regards its power density. Recognition of the signal is not effected by time selection or on the basis of frequency, but on the basis of the spectral code. The superposed plurality of such spectrally encoded messages in the code multiplex channel are selected in the receiver on the basis of the code word assigned to it. For the two-stage modulation (basic and multiplex modulation), phase shift keying (PSK) or frequency shift keying (FSK) are frequently used in radio transmission systems.

The digitised speech signal at the transmitter end is, for example, applied (after A/D conversion) to the first stage which includes, for example, a multiplicative mixer. In the multiplicative mixer the applied digitised speech signal is combined with a code word assigned to this transmitter, which results in a spectral distribution. In the second modulation stage of the transmitter the wide-band signal (modulated, binary character sequences) are coverted to a frequency position appropriate for the transmission.

Recovering the message at the receiver end is effected in the above-described code-division multiplex method by the sequence of base-demodulation and multiplex-demodulation. In the base-demodulation stage the conversion to a frequency position (for example base-band position) appropriate for the. multiplex-demodulation is effected by multiplying the signal by the reference carrier. With the aid of a code word generator arranged in the receiver and also a code-synchronising circuit, the spectral distribution is cancelled, after the code word generator has been synchronised in the correct phase with the reception code word. As a result thereof the signal energy which was previously spectrally distributed over the overall transmission band, is compressed back into the original narrow frequency band, whilst the adjacent signals reaching the receiver by means of a different multiplex modulation remain spectrally distributed and can be suppressed using a bandpass filter having a bandwidth which corresponds to the bandwidth of the non-distributed signals.

The system-determined residual noise still remaining in the multiplex demodulation and caused by the other signals is smaller according as the values of the cross-correlation functions between the code words used are lower and the distribution factor is greater. A value different from zero of the cross-correlation function reduces the signal-to-noise ratio. The signal-to-noise ratio and the synchronising period are determined by the cross-correlation and autocorrelation functions.

In the frequency-division multiplex method the total bandwidth available for the transmission of messages is divided into narrow frequency bands which each correspond to a message transmission channel. For the duration of the radio transmission the subscriber has such a narrow frequency band at its disposal.

In the time-division multiplex method each subscriber has the disposal of the total bandwidth of an individual radio channel, which the subscriber may use only for short time intervals. The characters or character sequences of different subscribers are interleaved and are transmitted at a correspondingly higher bit rate in the individual radio channel, the time channel assigned to each subscriber being repeated periodically at the frame period intervals.

West German Patent DE-OS 25 37 683 discloses a radio transmission system with stationary radio stations and mobile radio stations, in which different channel-accessing methods with asynchronous time multiplex, code multiplex and frequency multiplex are used.

In a radio transmission system connections are effected via repeatedly reflected propagation paths containing obstacles. The low effective aerial height and the necessary circular radiation characteristic of the aerials of mobile radio stations effect that the receiving field strength is exclusively composed of the interference from sub-field strengths, which are produced by multipath propagations as a result of reflections from the earth, mountains, buildings, etc. The receiving voltage pulled in by the aerial is additionally amplitude and phase-modulated by superpositioning of the sub-field strength. The reflected signal components reach the aerial with different time delays via different paths. The influence of the multi-path propagation is particularly noticeable when the delay time difference between the direct and the reflected signals is more than half the duration of a code word character in the signal. The signal mix produced by this multi-path propagation results in location-dependent amplitude distributions. In the range of small receiving field strengths the minima of this amplitude distribution result in position-dependent values falling short of the limit sensitivity, and consequently result in disturbed connections. For stationary vehicles the fluctuation in the received voltage is comparatively low. If the vehicle moves, the noise spectrum is significantly more pronounced. The disturbances in the connection, whose duration and rate of occurrence depend on the speed and correspond to a Rayleigh distribution, are based on a field strength distribution which depends on the route taken by the vehicle and depends on the reflection coefficients of the environment. In the case of disadvantageous propagation circumstances or high vehicle speeds, error rates of much more than 1% can be measured, which for a brief period of time reach approximately 50%.

It has been found that because of the system-determined noise the code-division multiplex method has a smaller signal-to-noise ratio than the time-division multiplexer method or the frequency-division multiplex method. However, because of the spectral compression of the message energy the signal-to-noise ratio in the receiver improves in accordance with the distribution factor (number of code word characters per message character). During the transmission of the message from the mobile radio station to the stationary radio station the receiving energy in the stationary radio station is lower according as the distance to the mobile radio station is longer. Differences in distance by a factor of 10 result, on an average, in energy differences of 40 dB, so that each mobile radio station requires a transmission power control for the necessary dynamic compensation. In addition to the disadvantage that a larger bandwidth is required, the code-division multiplex method has, compared with the time-division multiplex or frequency-division multiplex method, the further disadvantage that the code synchronisation is significantly more expensive. On the other hand, no adjacent channel problems occur in the code-division multiplex method, as may be the case in the frequency-division multiplex method because of overlapping frequency bands, or in the time-division multiplex method because of overlapping time slots. Because of the spectral "distribution" of the transmission energy, wide-band noise sources and also other noise sources result in code words superposed on the sum signal, so that a code-division multiplex system is inferior to other systems as regards frequency.

The disadvantage of requiring a larger bandwidth is compensated for in a radio transmission system by the advantage that the same frequency band can be utilized in spatially adjacent radio cells, so that the overall bandwidth-assuming that a rather large number of molbile radio stations are permitted in the radio transmission system—is of the same order of magnitude as the overall bandwidth in the frequency-division multiplex method. Because of the same frequency band it is easy to implement a radio cell exchange by the mobile radio station.

The code-division multiplex method has, compared with the frequency-division multiplex method, the advantage that, using the same code word, signalling information components can be radiated simultaneously to all the mobile radio stations. However, the code-division multiplex method, because of the significantly fluctuating differences in the distances between mobile and stationary radio stations determined by the large attenuation differences during the wave propagation, has the disadvantage that it requires a power control in each mobile radio station. The time-division multiplex method has the disadvantage that—in order to avoid to a significant extent the cancellations of modulation in binary encoding—only a maximum bit rate of approximately 50 kbit/s can be accomplished. This maximum bit rate is however not sufficient to provide a large time-interleaing of the signals from a plurality of subscribers, as this quantity of information corresponds already to the quantity of information from only a few subscribers (2-3 subscribers).

Combinations of the above-described methods and their use in a digital radio transmission system are also known. For example "Nachrichtentechnik, Elektronik+Telematic 38 (1984), Vol. 7, pages 264 to 268" discloses a digital radio transmission system in which the time-division multiplex method is used in combination with the code-division multiplex method. In the time channels for transmitting speech and/or data (communication channel TCH) there are transmitted, one after the other, a bit sequence for determining the bit clock rate (synchronous), a frame-synchronising word (leader) and the bit sequence of the message itself. The time channels for the transmission of messages ($3 \times 20$ TCH) are combined with control channels (3 CCH) to form a time-division multiplex frame having a duration of 31.5 msec. If the speech signal is to be transmitted as a message, then the adaptive delta modulation method can be used for analog/digital conversion. The message characters (bits) then produced are superposed by a code in a transmitter. It was found to be advantageous to combine individual message characters in blocks of four bits each and to distribute the blocks thus obtained with an orthogonal alphabet. The distribution factor then used is a compromise, to make it possible to combine the advantages of the band distribution with the requirements as regards the economic use of frequency.

All the radio transmission systems known so far have in common that the message transmission channels between stationary and mobile radio stations are of a symmetrical structure, that is to say the same modulation method is used for the forward and return directions. So far no investigations have been made to investigate whether, when each time a different modulation method is used for the forward and return directions of the message transmission channels the above-described disadvantages can be avoided.

SUMMARY OF THE INVENTION

The invention is based on the recognition that in the direction from the stationary radio station to the mobile radio stations an information component distribution is effected, whilst in the direction from the mobile radio station to the stationary radio station a point-to-point connection exists.

The invention has for its object to provide a message transmission system which enables a flexible adaptation to new services in digital radio transmission systems and results in an increased flexibility of the digital radio transmission system.

The method according to the invention has the advantage that because of the code-division multiplex modulation in the stationary radio station in the transmit direction (direction from the stationary radio station to the mobile radio stations) no costly combination is required and the power and space requirements in the stationary radio station can be reduced in a simple way and manner. In the mobile radio station, compared with the frequency-division multiplex method, no high carrier or oscillator stability and no plurality of filters are required and the cost and design efforts for a synthesiser can be reduced.

When frequency-division multiplex methods are used in the direction from the mobile radio stations to the stationary radio station no safety margins are required, compared with the time-division multiplex method, between the time channels of the time-division multiplex frame, and no range limitation. Compared with the code-division multiplex method, the cost and design efforts in the stationary radio station for synchronising purposes can be reduced and no external dynamic compensation in each mobile radio station is required.

If the code-division multiplex modulation is permanently assigned to each mobile radio station, then the circuit cost and design efforts (simpler control circuit) in the mobile radio station can be reduced.

The method has the advantage that it can be adapted in a simple way to changing traffic conditions and that the code selection requires less efforts.

If a code-division multiplex modulation, used in common by all the mobile radio stations, is used for the control channel then a control channel which is used in common by all the mobile radio stations can be made available in a simple way and manner.

If the distributed sum signal is amplified in a HF-power amplifier provided in one of the stationary radio stations, then the power and space requirements therefor can be reduced.

The method has the advantage that non-active mobile radio stations do not disturb other existing connections. A portion corresponding to the speech interval of the subscriber participating in the connection is not taken into account during the sum formation.

In accordance with one embodiment of applicant's method radio cells of adjacent stationary radio stations are distinguished from each other by different code-division multiplex modulation methods. A division of the traffic load can then be effected making it possible for the stationary radio stations to transmit in a common frequency band.

Another embodiment of applicant's method has the advantage that a lower distribution factor can be used and consequently the requirements as regards frequency economy are satisfied by an appropriate distribution and less serious problems occur in the frequency coordination with other countries or other services.

In another embodiment of applicant's method a smaller distribution factor can be used in the stationary radio station.

The method has the advantage that the group formation effected in the mobile radio station, compared with the frequency-division multiplex method, now requires a lower number of different frequency channels. If instead of a synthesiser only a quartz oscillator's used in the mobile radio station, the mobile radio station can be produced at an attractive price level.

The method further has the advantage that the repetition rate of the frequencies in adjacent radio cells can be lower and that a dynamic frequency division is possible.

BRIEF DESCRIPTION OF THE DRAWINGS

The message transmission method according to the invention will now be described and illustrated in greater detail with reference to a preferred embodiment as illustrated in the accompanying drawings wherein:

FIG. 1 shows the block circuit diagram of a circuit arrangement for transmitting information in the transmission direction in accordance with the invention, and FIG. 2 shows an embodiment of the code-division multiplex modulation arrangement.

DESCRIPTION OF THE PREFERRED EMBODIMENTS

The digital radio transmission system shown in FIG. 1 comprises stationary radio stations BS arranged in a cellular network, and a plurality of mutually independent mobile radio stations MS. For the transmission of messages the mobile radio stations MS access one out of a plurality of message channels. In the direction from the stationary radio station BS to the mobile radio stations MS assigned to it, each message channel is multiplexed by code-multiplex division modulation. The multiplex message channels are superposed on each other by frequency division and the resulting wideband sum signal is transmitted in a single frequency band. In the direction from the mobile radio stations MS to the stationary radio station BS the transmission of messages is effected in mutually separated, narrow-band frequency channels.

In stationary station BS the digital message signals obtained from i different message sources $NQ_1 \ldots NQ_i$ are each applied to a code-division multiplex modulation arrangement $EBS_1 \ldots EBS_i$. The output signals of the code-division multiplex modulation arrangements $EBS_1 \ldots EBS_i$, which output signals are located in a common frequency band, are applied to an adder SUBS, whose output signal is applied to a transmitter arrangement SBS. In moble station MS the message signals originating from a message source NQMS assigned to that station are each applied via a modulator MMS to a transmitter arrangement SMS. For the sake of simplicity and an easier understanding of the invention, the mutually associated receiver arrangements and message data sinks in the stationary radio station BS and the mobile radio station MS are not shown in FIG. 1.

For the transmission of speech in the direction from the stationary radio station BS to the mobile radio stations MS, the code-division multiplex modulation to be utilized in the mobile radio station NS is selected by the stationary radio station BS and is reported during the connection set-up to the mobile radio station MS. For the transmission of signalling information to the mobile radio stations MS assigned to the stationary radio station BS in the direction from the stationary radio station BS to the mobile radio station MS, a code-division multiplex modulation is used which is common to all the mobile radio stations.

To distinguish between stationary radio stations BS arranged in adjacent radio cells they transmit, in the direction from the stationary radio station BS to the mobile radio stations MS, in different frequency bands. The stationary radio stations BS comprise narrow-band receivers (not shown) which are switchable to several different frequency channels during operation. The number of the transmission frequencies switchable in the mobile radio stations MS is less than the number of received frequencies switchable in the stationary radio station BS. It is, for example, possible to switch in the stationary radio station BS to 1,000 frequencies and in the mobile radio station MS a switch can be made to 40 frequencies.

Because of the interference situation the receive frequencies used in each stationary radio station BS are managed there. In the event of disturbances in reception the relevant connection, in the direction from the mobile radio station MS to the stationary radio station BS, is switched to a different, non-disturbed frequency channel to which both the stationary radio station BS and also the mobile radio station MS can be switched. The receive arrangement in the stationary radio station BS in the direction to the wired network of the public telephone system continues to participate in the connection.

The embodiment of a code-division multiplex modulation arrangement $EBS_i$, shown in FIG. 2, comprises, in correspondence with the number M of sources of the digital message signal, also M switching signal generators $SG_1 \ldots SG_M$. The switching signal generators SGm (where m=1 ... M) produce several periodic signals Smi. In dependence on the instantaneous switching signal generator SGm, a change-over switch u connected to the switching signal generators SG1...SGM is controlled such, that the signal Smi associated with the message source m is present at its output, which signal is applied to the output of the arrangement for code-division multiplex modulation EBSi.

What is claimed is:

1. A method of transmitting messages in a digital radio transmission system comprising a plurality of stationary radio stations (BS) arranged in a cellular network and a plurality of mutually independent mobile radio stations (MS) assigned thereto, transmission of messages between a stationary radio station and its assigned mobile stations being effected over a plurality of message channels; characterized in that: transmission of messages from a stationary radio station (BS) to the respective mobile radio stations (MS) assigned thereto is effected over message channels formed by code-division multiplex modulation of such messages; the resulting code-division multiplexed messages are combined to form a wideband sum signal which is transmitted in a common frequency band; and transmission of messages from respective mobile radio stations (MS) to a stationary radio station (BS) to which they are assigned is effected in respective narrw-band frequency channels.

2. A method as claimed in claim 1, characterized in that the code-division multiplex modulation channel for each mobile radio station (MS) is formed in accordance with a code word permanently assigned to such mobile radio station (MS).

3. A method as claimed in claim 2, characterized in that the code word assigned to a mobile radio station is selected by the stationary radio station (BS) and is reported thereby to such mobile radio station (MS) prior to transmission of messages to such mobile radio station.

4. A method as claimed in claim 1, wherein each of said messages include signalling information, and further characterized in that transmission of signalling information from a stationary radio station (BS) to mobile radio stations (MS) assigned thereto is effected over a common code-division multiplex modulation channel to all such mobile radio stations.

5. A method as claimed in claim 1, characterized in that said wideband sum signal transmitted from the stationary radio station to the mobile radio stations assigned thereto is amplified in a common HF-power amplifier in the stationary radio station prior to such transmission.

6. A method as claimed in claim 1, characterized in that respective stationary radio stations in adjacent cells in said cellular network transmit to mobile radio stations assigned thereto in respective frequency bands.

7. A method as claimed in claim 1, characterized in that respective stationary radio stations (BS) in adjacent radio cells in said cellular network are time-synchronised with each other and transmit to the mobile radio stations assigned thereto in respective time channels.

8. A method as claimed in claim 1, characterized in that each stationary radio station employs binary code-division multiplex encoding for code-division multiplex modulation of messages transmitted to mobile radio stations assigned thereto.

9. A method as claimed in claim 1, characterized in that each stationary radio station switches to any of a plurality of frequency channels during reception of messages from mobile radio stations assigned thereto.

10. A method as claimed in claim 9, characterized in that messages are transmitted by each of the mobile radio stations in any of a plurality of frequency channels, the number of such channels being less than the number of frequency channels to which the base radio stations assigned thereto can switch during reception of such messages.

11. A method as claimed in claim 10, characterized in that each stationary radio station switches its receiving frequency channels such that in the event of disturbances in an existing channel to a mobile radio station assigned thereto a different non-disturbed frequency channel is established between the stationary radio station and such mobile radio station.

12. A digital radio transmission system comprising a plurality of stationary radio stations arranged in a cellular network and a plurality of mobile radio stations which, for transmitting messages, access a plurality of message channels to a stationary radio station to which they are assigned; transmission from a stationary radio station to its assigned mobile stations being effected by code-division multiplex modulation and transmission from respective mobile stations to the stationary radio stations to which they are assigned being effected over respective narrow-band frequency channels; characterized in that:

each stationary radio station comprises
respective code-division multiplex modulators ($EBS_1$ ... $EBS_i$) for respective sources ($NQ_1$ ... $NQ_i$) of digital message signals to be transmitted, such modulators producing code-division multiplex signals in a common frequency band;
an adder connected to said code division multiplex modulators for combining the code-division multiplexed signals produced thereby into a single output signal; and
a transmitter connected to said adder for transmitting said output signal in a frequency band assigned to such stationary radio station;
and each of the mobile radio stations comprises:
a modulator (MMS) for modulating digital message signals to be transmitted by such mobile radio station, the modulated signals from respective mobile radio stations being within respective narrow-band frequency channels, and
a radio transmitter connected to said modulator for transmitting the modulated signal produced thereby.

13. A digital radio transmission system as claimed in claim 12, further characterized in that the code-division multiplex modulators in each stationary radio station comprise time-division multiplex switching means for connecting a plurality of sources of digital message signals in time-division multiplex to each of such modulators.

* * * * *